United States Patent
Takahashi et al.

(10) Patent No.: US 8,363,192 B2
(45) Date of Patent: Jan. 29, 2013

(54) LIQUID CRYSTAL DISPLAY DEVICE

(75) Inventors: Kazuhiro Takahashi, Ishikawa-ken (JP);
Masanobu Nonaka, Ishikawa-ken (JP);
Masanori Ando, Ishikawa-ken (JP);
Kazuyuki Sunohara, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 789 days.

(21) Appl. No.: 12/561,820

(22) Filed: Sep. 17, 2009

(65) Prior Publication Data
US 2010/0066967 A1 Mar. 18, 2010

(30) Foreign Application Priority Data

Sep. 18, 2008 (JP) .................................. 2008-239963
Jan. 7, 2009 (JP) .................................. 2009-001908

(51) Int. Cl.
*G02F 1/1343* (2006.01)
*G02F 1/1345* (2006.01)
(52) U.S. Cl. .......................... 349/139; 349/143; 349/149
(58) Field of Classification Search .................. 349/139, 349/143, 149
See application file for complete search history.

(56) References Cited

U.S. PATENT DOCUMENTS
2004/0001176 A1* 1/2004 Kim et al. ..................... 349/139

FOREIGN PATENT DOCUMENTS
JP 2008-058357 3/2008

* cited by examiner

*Primary Examiner* — Nathanael R Briggs
(74) *Attorney, Agent, or Firm* — Oblon, Spivak, McClelland, Maier & Neustadt, L.L.P.

(57) ABSTRACT

A liquid crystal display device includes a liquid crystal display panel having an active area in which pixels are arranged in a matrix including first and second signal lines and connecting lines. The second signal lines and connecting lines extend in a column direction in the active area. The first signal lines extend in a row direction so as to cross the second signal lines and the connecting lines. The first signal lines are connected to the connecting lines through contact portions provided at the cross area where the first signal lines cross with the connecting lines interposing an insulating layer. The second signal lines and the connecting lines are pulled out from the active area to a signal supply source provided at outside of the active area without detouring in a peripheral region of the display panel.

33 Claims, 14 Drawing Sheets

LIQUID CRYSTAL DISPLAY DEVICE

CROSS-REFERENCE TO RELATED APPLICATION

This application is based upon and claims the benefit of priority from prior Japanese Patent Applications No. 2008-239963 filed Sep. 18, 2008 and No. 2009-001908 filed Jan. 7, 2009, the entire contents of which are incorporated herein by reference.

BACKGROUND OF THE INVENTION

1. Field of the Invention

The present invention relates to a liquid crystal display device having gate connecting lines to supply scan signals to gate lines formed in different layers interposing an insulating layer therebetween in an active area.

2. Description of the Background Art

Liquid crystal display devices are widely used as display devices for various kinds of equipments such as personal computers, OA equipments, and TV sets because the display devices have many advantages such as lightness, compactness and low power consumption. In recent years, the liquid crystal display device has also been used in mobile terminal equipments such as a mobile phone, a car navigation device and a game player. The liquid crystal display device includes a liquid crystal display panel formed of an array substrate, a counter substrate attached to the array substrate by a seal element and a liquid crystal layer held therebetween.

Recently, a high resolution display has been desired in the liquid crystal display device, accompanied with increase in the number of gate lines and source lines with pixels. Accordingly, the number of pull out lines to connect the gate lines and source lines to a signal supply sources increases, which results in increase in outside area of the active area where the pull out lines are formed, further results in a large size frame.

In Japanese Patent Application No. 2008-58357, an arrangement to solve the above problem is described, in which a paired gate lines are connected to a pull out line together, and first and second source lines arranged between adjacent pixels in parallel are alternately connected to the pixels. Switching transistors of the pixels commonly connected one of the paired gate lines are connected to the first source line and the other swiching transistors are connected to the second source line. Accordingly, respective transistors are driven independently.

In the above arrangement, the pull out lines to connect the gate lines to a gate signal supply source are located along edges in a peripheral area of the panel, which is apart from an area where gate and source signal input terminals are formed. Therefore, the area to arrange the pull out lines is required yet, and prevents to achieve a narrow frame display.

BRIEF SUMMARY OF THE INVENTION

The present invention has been made to address the above mentioned problems.

Thus, according to one aspect of the invention, there is provided a liquid crystal display device including a liquid crystal display panel, comprising: an active area including a plurality of pixels arranged in a matrix; first signal lines extending in a row direction in the active area; connecting lines formed in a column direction and arranged so as to cross with the first signal lines interposing an insulating layer; contact portions to connect the first signal lines with the connecting lines; second signal lines arranged in parallel with the connecting lines in the active area; and a signal supply source arranged in a peripheral region located along the active area so as to cross with a line extending in the column direction, and, wherein the connecting lines and the second signal lines are pulled out from the active area to the signal supply source to receive signals from the signal supply source.

According to another aspect of the invention, there is provided a liquid crystal display device including a liquid crystal display panel, comprising: an active area including a plurality of pixels arranged in a matrix; first signal lines extending in a row direction in the active area; connecting lines formed in a column direction and arranged so as to cross with the first signal lines interposing an insulating layer; contact portions to connect the first signal lines with connecting lines; second signal lines arranged in parallel with the connecting lines in the active area; a signal supply source arranged in a peripheral region located along the active area so as to cross with a line extending in the column direction; and, wherein the connecting lines and the second signal lines are pulled out from the active area to the signal supply source to receive signals from the signal supply source, and wherein the signal supply source includes a first pad to supply a first signal to the connecting lines and a second pad to supply a second signal to the second signal lines.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF PREFERRED EMBODIMENTS

Figure 1:
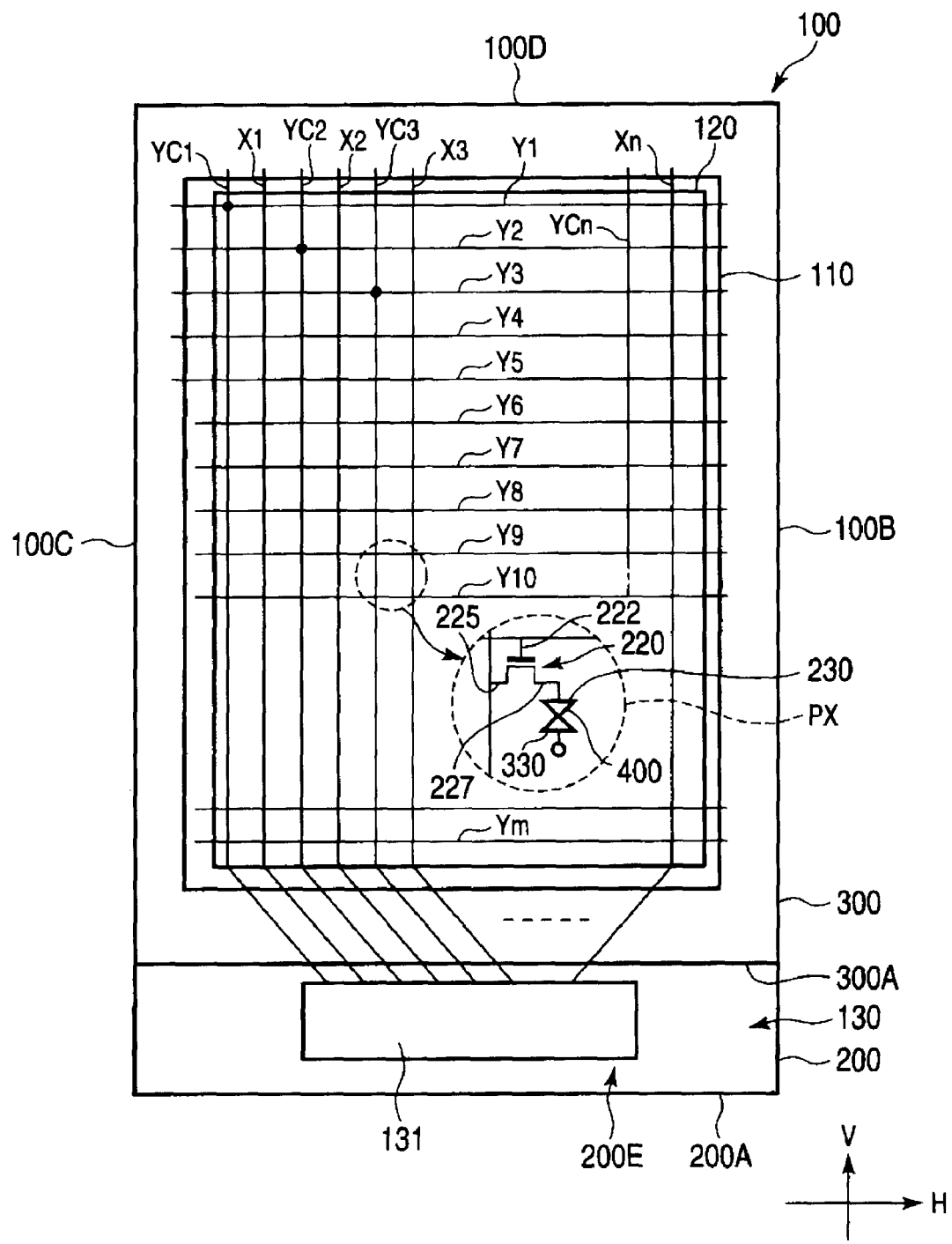
FIG. 1 is a schematic plan view showing a liquid crystal panel of a liquid crystal display device according to a first embodiment of the invention.

A liquid crystal display device according to an exemplary embodiment of the present invention, in particular, a liquid crystal display device having gate connecting lines to supply scan signals to gate lines formed in different layers interposing a gate insulating layer therebetween in an active area, will now be described with reference to the accompanying drawings wherein the same or like reference numerals designate the same or corresponding parts throughout the several views.

Figure 2A:
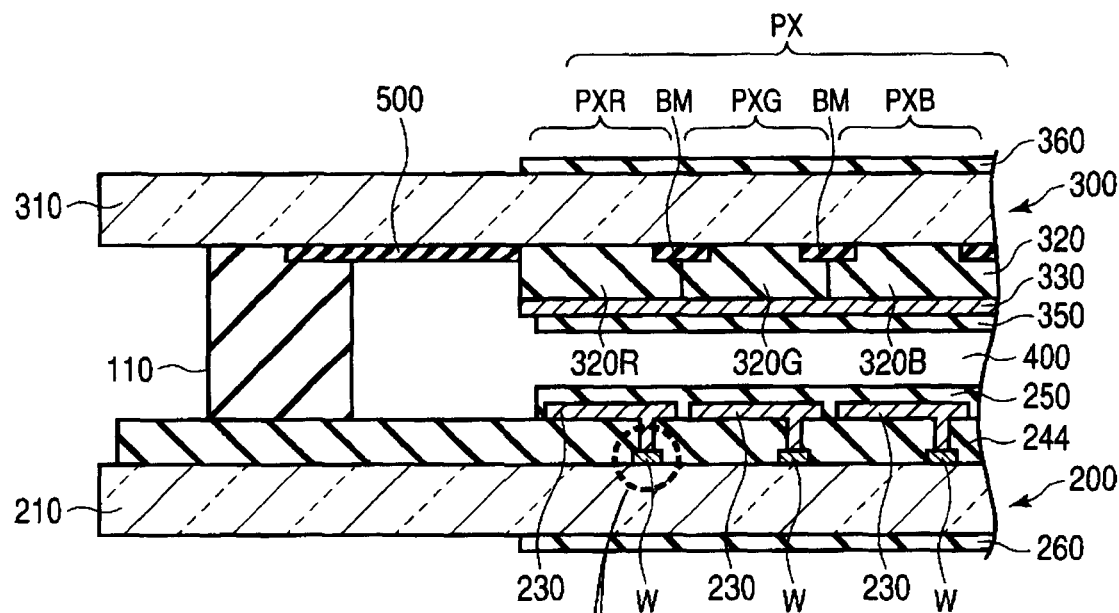
FIG. 2A is a cross-sectional view showing the liquid crystal panel shown in FIG. 1 according to the first embodiment of the invention.
Figure 2B:
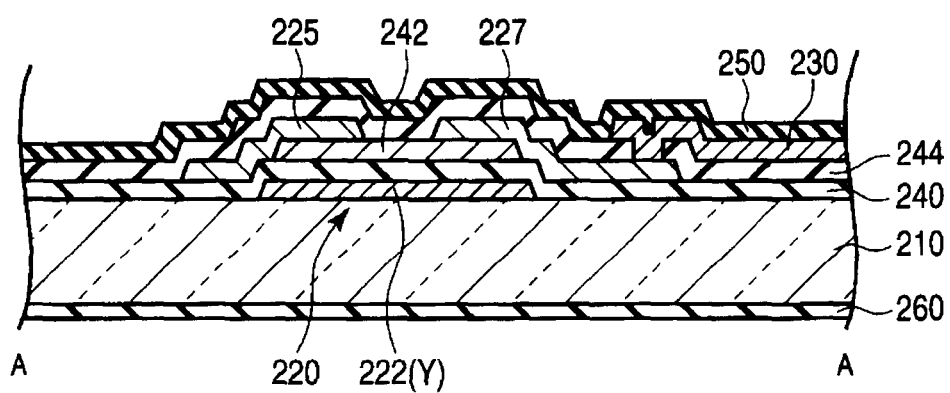
FIG. 2B is a cross-sectional view showing the liquid crystal panel shown in FIG. 3 taken a line A-A according to the first embodiment of the invention.

As shown in FIGS. 1, 2A and 2B, a liquid crystal display device according to the invention includes a liquid crystal display panel 100. The liquid crystal display panel 100 is formed of a pair of substrates, e.g., an array substrate 200 (first substrate), and a counter substrate 300 (second substrate) and a liquid crystal layer 400 interposed therebetween. The liquid crystal display panel 100 includes an active area 120 in a rectangular shape.

The array substrate 200 and the counter substrate 300 are attached by a seal element 110 and maintain a predetermined gap to hold the liquid crystal layer 400 therebetween. The gap may be build by columnar spacers integrally made of one of the substrates. The liquid crystal layer 400 is formed of liquid crystal molecules injected into the gap. The rectangular active area 120 is located inside of the sealed portion by the seal element 110. The active area 120 is formed of a plurality of pixels.

The array substrate 200 includes a plurality of gate lines Y (1, 2, 3, . . . , m) referred to first lines extending in a row direction of pixels PX arranged in a matrix, a plurality of gate connecting lines YC (1, 2, 3, . . . , n) and a plurality of source lines X (1, 2, 3, . . . , n), respectively extending in a column direction of the pixels PX arranged in a matrix, switching elements 220 located at intersections crossing with the source lines X and the gate lines Y, and pixel electrodes 230 arranged in each of the pixels PX in the active area 120.

The gate lines Y and the gate connecting lines YC are arranged so as to cross each other interposing an insulating layer therebetween. Similarly, the gate lines Y and source lines X are arranged so as to cross each other interposing an insulating layer therebetween. On the other hand, the gate connecting lines YC and source lines X are arranged in parallel each other in the active area 120. The gate connecting lines YC and the source lines X may be arranged in a layer on the same insulating layer or may be arranged in different layers. That is, one of the gate connecting lines YC and the source lines X is covered with an insulating layer and the other is arranged on the insulating layer. The gate connecting lines YC and the gate lines Y are electrically connected through contact portions.

The switching elements 220 are, for example, formed of thin film transistors (TFTs) which include semiconductor layer such as poly-silicon or amorphous. Respective gate electrodes 222 of the switching elements 220 are connected to the gate lines Y (or the gate electrodes 222 are integrally formed with the gate lines Y). Source electrodes 225 of the switching elements 220 are connected to the source lines X (or the source electrodes 225 are integrally formed with the source lines X). Drain electrodes 227 of the switching elements 220 are electrically connected to respective pixel electrodes 230.

The counter substrate 300 includes a counter electrode 330 opposite to each of the plurality of pixel electrodes 230. The liquid crystal display panel 100 includes a signal supply source 131 arranged in a peripheral area outside of the active area 120. The signal supply source 131 is provided with a plurality of pads connectable with IC chips which function as a signal supply source including a gate driver and a source driver. The pads include input terminals to receive signals from outside and output terminals to supply signals to the gate connecting lines YC, the gate lines Y and source lines X. A flexible substrate made of a plastic film is connected to the input pads of the signal supply source 131 to supply signals such as image signals and clock signals thereto. The output pads include pads PG connected to the gate connecting lines YC and pads PS connected to the source lines X.

In the embodiment shown in FIG. 1, the signal supply source 131 is formed in an extending area 200E in the array substrate 200 extending beyond an edge 300A of the counter substrate 300. That is, the array substrate 200 is formed in the same shape as the counter substrate 300, but the extending area 200E does not face the counter substrate 300. The signal supply source 131 is located adjacent one edge of the liquid crystal display panel 100. Particularly, in this embodiment, the extending area 200E is located outside region 130 of the active area 120 along an edge 200A of the array substrate 200 and the edge 300A of the counter substrate 300. That is, the signal supply source 131 is arranged between the respective edges 200A and 200B of the array substrate 200 and the counter substrate 300

Each of the gate lines Y is arranged in the row direction in the array substrate 200 so as to have a length slightly larger than width of the array substrate in the row direction. Each of the gate lines Y is connected to one of the gate connecting lines YC, which are pulled out from the active area 120 to outside region 130 of the active area 120 and connected to the signal supply source 131. As a consequence, scan signals supplied from the signal supply source 131 to each of the gate connecting lines Y are provided to a corresponding gate line Y.

Similarly, the source lines X which are pulled out from the active area 120 to outside region 130 of the active area 120 and connected to the signal supply source 131. The image signals supplied from the signal supply source 131 are provided to each source line Y.

In this embodiment, the signal supply source 131 is arrange in the outside region 130 along the edge 300A of the active area 120, which orthogonally intersects with the gate connecting lines YC and the source lines X extending in the column direction. Therefore, a space to pull out the gate connecting lines YC and the source lines X to peripheral regions along the edges 100C and 100B in the active area 120 is not required, which results in achieving a narrow frame i.e. decrease in the frame size of the liquid crystal display panel 100.

Practically, the width between the active area 120 and the edge 100C, and between the active area 120 and the edge 100B are made small. Further, it is also possible to make the width between the active area 120 and an edge 100D opposite to the edge 300A small.

Accordingly, the liquid crystal display device with a narrow frame can be obtained. Since, the gate connecting lines YC are arranged in the active area 120, even in the case the number of the pixels, i.e. the number of gate lines Y, increases with the higher resolution display, the embodiment can be applied.

Next, the construction of the array substrate 200 and the counter substrate 300 is described in detail. As shown in FIGS. 2A and 2B, the array substrate 200 is formed of a rectangular insulating substrate 210 such as a glass substrate with transmissive characteristic. The gate electrode 222 of the switching element 220 is arranged on the insulating substrate 210 with the gate line Y. In the embodiment shown in FIG. 2B, the gate electrode 222 is formed together the gate line Y. That is, the gate line Y and the gate electrode 222 are formed of the same material. The gate line Y and the gate electrode 222 are covered with a gate insulating layer 240, which is, for example, made of silicon nitride ($Si_3N_4$).

A semiconductor layer 242 in the switching element 220 is arranged on the gate insulating layer 240 facing the gate electrode 222. The semiconductor layer 242 is, for example, made of amorphous silicon or poly-silicon. Source electrode 225 and drain electrode 227 are arranged on the gate insulating layer 240 with the source line X. The source electrode 225 is connected to the source line X or is integrally formed of the source line X, and contacts with the semiconductor layer 242. The drain electrode 227 is connected to the pixel electrode 230 and contacts with the semiconductor layer 242. The source electrode 225 and the drain electrode 227 may be manufactured by the same process and the same material, and are covered with a passivation layer 244 such as silicon nitride ($Si_3N_4$) layer.

The pixel electrode 230 is arranged on a passivation layer 244 facing the pixel PX. The pixel electrode 230 is connected to the drain electrode 227 of the switching element 220 through a contact hole formed in the passivation film 244.

In a transmission mode liquid crystal display panel, in which a picture is displayed by selectively transmitting light from a backlight unit provided at a rear side of the liquid crystal display panel, the pixel electrode 230 is made of conductive and transmissive material such as Indium Tin Oxide (ITO) and Indium Zinc Oxide (IZO). On the other hand, in a reflective mode liquid crystal display panel, in which a picture is displayed by selectively reflecting light that penetrates from outside, the pixel electrode 230 is made of reflective material such as Aluminum (Al) and Molybdenum (Mo).

The surface of the array substrate 200 is covered with an alignment film 250 to control an alignment of liquid crystal molecules contained in the liquid crystal layer 400. The counter substrate 300 is formed of an insulating substrate 310 with a rectangular shape and transmissive characteristic such as a glass substrate. The counter substrate 300 includes a black matrix BM facing wiring regions W such as the gate lines, source lines X and switching elements 220, and a color filter layer 320 arranged so as to correspond to the pixels PX in the active area 120.

A black matrix BM that is made of a black colored resin film is formed on the insulating counter substrate 310 in a matrix. The black matrix BM is formed of a back colored resign or a metallic layer having light blocking characteristic such as chromium Cr. The color filter layer 320 is arranged in an effective region surrounded by a peripheral shield layer 500. The color filter layer 320 is formed of three types of colored resins such as red color resin (R), green colored resin (G) and blue colored resin (B). A red color filter layer 320R is arranged in the red color sub-pixel PXR so as to transmit red color. A green color filter layer 320G is arranged in the green color sub-pixel so as to transmit the green color. Similarly, a blue color filter layer 320B is arranged in the blue color sub-pixel PXB so as to transmit the green color. The color filter layers (R, G, B) may be formed on the array substrate 200.

The peripheral shield layer 500 is, for example, formed of a black colored resin and may be formed of the same material and the same process as the black matrix BM. A common electrode 330 to supply a voltage difference between the pixel electrode 230 to the liquid crystal display layer 400 may be formed on the counter substrate 300 or the array substrate 200. The common electrode 330 is made of conductive material with a transmissive characteristic such as ITO or IZO.

In the embodiment shown in FIG. 2A, a vertical mode in which a vertical electric field, e.g., an electric field that is vertical with reference to the main surface of the substrates, is used. The common electrode 330 is commonly arranged on the counter substrate 300 so as to face a plurality of pixel electrodes 230 interposing the liquid crystal layer 400 therebetween. Further, in a lateral electric mode, in which an electric field that is in parallel with the main surface of the substrates is used to control a switch operation of the liquid crystal layer 400, the common electrode 330 is arranged on the same array substrate 200 as the pixel electrode 230 so as to laterally face the pixel electrodes 230 by being isolated.

The surface of the counter substrate 300 is covered with an alignment film 350 to control the alignment of the liquid crystal molecules contained in the liquid crystal layer 400. In the reflective mode liquid crystal display device, an optical element 360 is provided on the outer surface of the counter substrate 300. On the other hand, in the transmissive mode liquid crystal display device, optical elements 260 and 360 are arranged on the array substrate 200 and the counter substrate 300, respectively. The optical elements 260 and 360 include polarizers in which a polarizing direction is set so as to fit to the characteristic of the liquid crystal layer 400. A retardation film may be used, if necessary.

Figure 3:
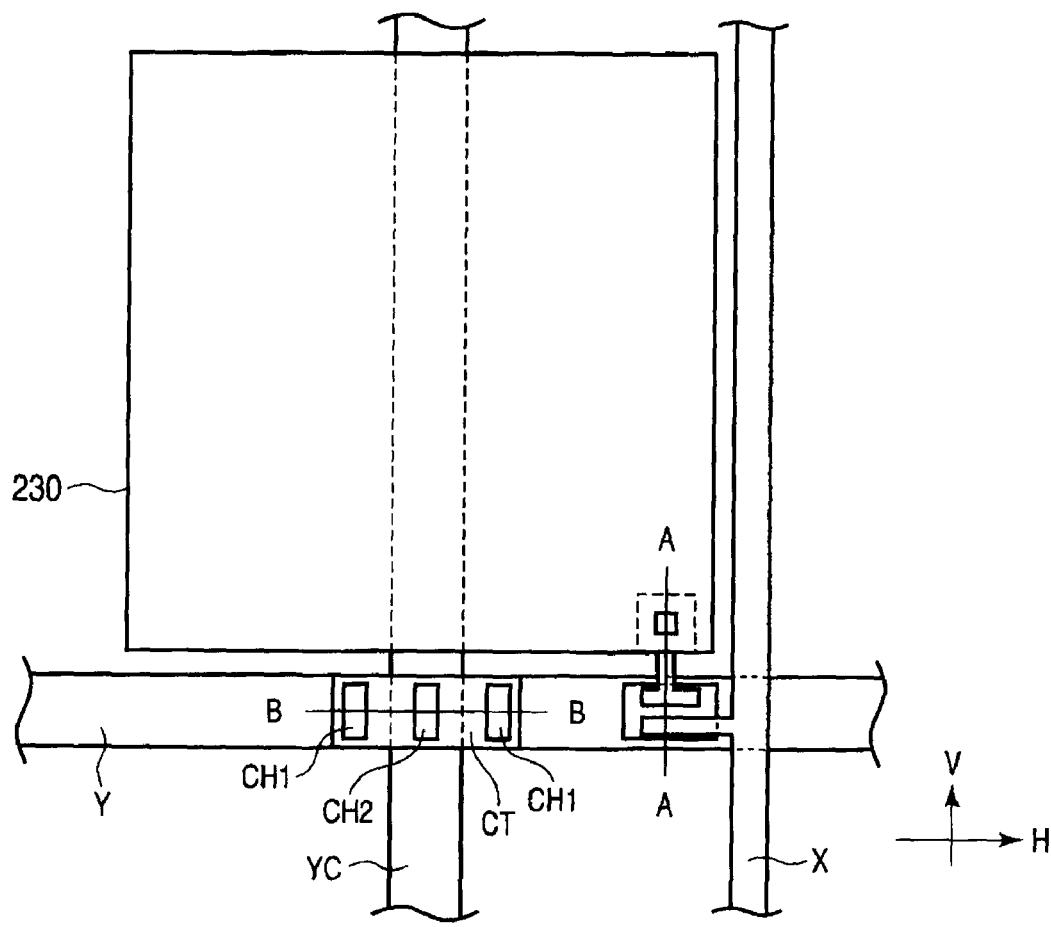
FIG. 3 is a plan view showing a structure of a pixel shown in FIG. 1 according to the first embodiment of the invention.
Figure 4:
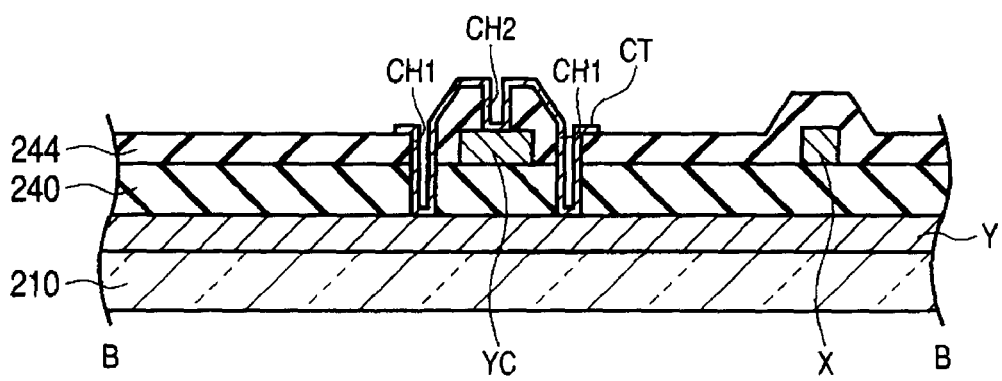
FIG. 4 is a cross-sectional view showing a structure of the pixel shown in FIG. 3 taken a line B-B according to the first embodiment of the invention.

As shown in FIGS. 3 and 4, the gate connecting lines YC and the source lines X are formed on the gate insulating layer 240, which covers the gate lines Y. That is, the gate lines Y cross with the gate connecting lines YC interposing the gate insulating layer 240. The gate connecting lines YC and source lines X are arranged in parallel and apart from each other on the gate insulating layer 240. Therefore, the gate connecting lines YC may be formed the same material as source lines X.

That is, in the case the gate connecting lines YC are formed of the same material as source lines X, both lines can be formed using the same manufacturing steps without adding some processes to provide the connecting lines YC, i.e. lowering a productivity, which results in increase in a manufacturing cost. As one example of dimensions of the source lines X and the gate connecting lines YC, the respective width of the source lines X and the gate connecting lines YC is about 3~5 µm and 10 µm. In the case the width of each pixel arranged in the row direction H is about 80 µm, a space of 30 µm between the gate connecting line YC and the source line X can be obtained by arranging the gate connecting lines YC in the center of a pixel PX (i.e. the center of the pixel electrode 230). According to this arrangement, even if the gate connecting lines YC and source lines X are formed using the same steps, a short circuit between the gate connecting lines YC and source lines X can be prevented by using a general photo lithography process.

The gate connecting lines YC face the pixel electrodes 230 interposing an interlayer insulating film 244. In the case the gate connecting lines YC are formed of the same material as source lines X, they are formed of conductive materials with non-transmissive characteristic such as MO, W and Al. In the transmissive mode liquid crystal device, light passes in the pixel electrodes 230 is shielded by the gate connecting lines YC, which results in reducing of an aperture ratio, though in the reflective mode liquid crystal display device, such shield (i.e. the reducing of the aperture ratio) is not made.

Therefore, it is desirable to form the gate connecting lines YC by a conductive material with transmissive characteristic. In this case, at least a portion of the gate connecting lines YC which faces the pixel electrodes 230 may be transmissive. Accordingly, it becomes possible to raise the aperture ratio because an area where the gate connecting lines YC and the pixel electrodes 230 face contributes to the display in the transmissive liquid crystal display device.

As above-mentioned construction where the gate lines Y cross with the gate connecting lines YC interposing a gate insulating layer 240, the contact portions CT to connect both lines are arranged at an area where the contact portions CT do not overlap with the pixel electrodes 230, i.e. the area which does not contributes to the display.

In this embodiment, the contact portions CT are arranged on the inter insulating film 244 at areas where the gate connecting lines YC cross with the gate lines Y, apart from the pixel electrodes 230. The contact portions CT are connected to the gate lines Y through first contact holes CH1 which penetrates the gate insulating layer 240 and the interlayer insulating film 244. On the other hand, the contact portions CT are connected to the gate connecting lines YC through second contact holes CH2 which penetrate the interlayer insulating film 244. The contact portions CT may be formed of the same material as the pixel electrodes 230. That is, in the case the contact portions CT are formed of the same material as the pixel electrodes 230, both lines can be formed using the same manufacturing steps without adding some processes to provide contact portions CT, i.e., lowering a productivity, which results in increase in the manufacturing cost. As shown in FIG. 1, the source lines X and the gate connecting lines YC are alternately arranged in the active area 120. The gate connecting lines YC, for example, a gate connecting line Y2 is arranged between adjacent two source lines X (source line X1 and source line X2). In this case, the gate connecting lines YC face the pixel electrodes 230 sandwiched by adjacent source lines X. Particularly, in this embodiment shown in FIG. 1, the number of source lines X and the gate connecting lines YC is the same in the active area 120.

That is, when the number of source lines X is n, the number of the gate connecting lines YC is also n. The gate connecting lines YC are arranged on each of pixel electrodes 230 of the pixels arranged in the column direction. In this embodiment, each of the gate connecting lines YC extends beyond the active area 120 to the extended rea 200 E in the column direction. Each of the gate connecting lines YC crosses with all gate lines Y (m gate lines Y, in FIG. 1) and faces all the pixel electrodes 230 of the pixels PX connected to each source lines X. Respective gate lines Y are electrically connected to at least one of the gate connecting lines YC.

The unevenness of wiring capacitance between the gate connecting lines YC is negligible, therefore, it is possible to supply optimum scan signals to each gate line Y without dispersion of a transmission delay of signals. Further, even when the gate connecting lines YC are formed of conductive material with non-transmissive characteristic, the area of the gate connecting lines YC which face the pixel electrodes 230 becomes almost the same for all pixelx PX, therefore, it becomes possible to eliminate the difference between the effective display areas of respective pixels which contribute to the display, (i.e. the difference of the aperture ratio), which results in providing a high quality display.

Figure 5:
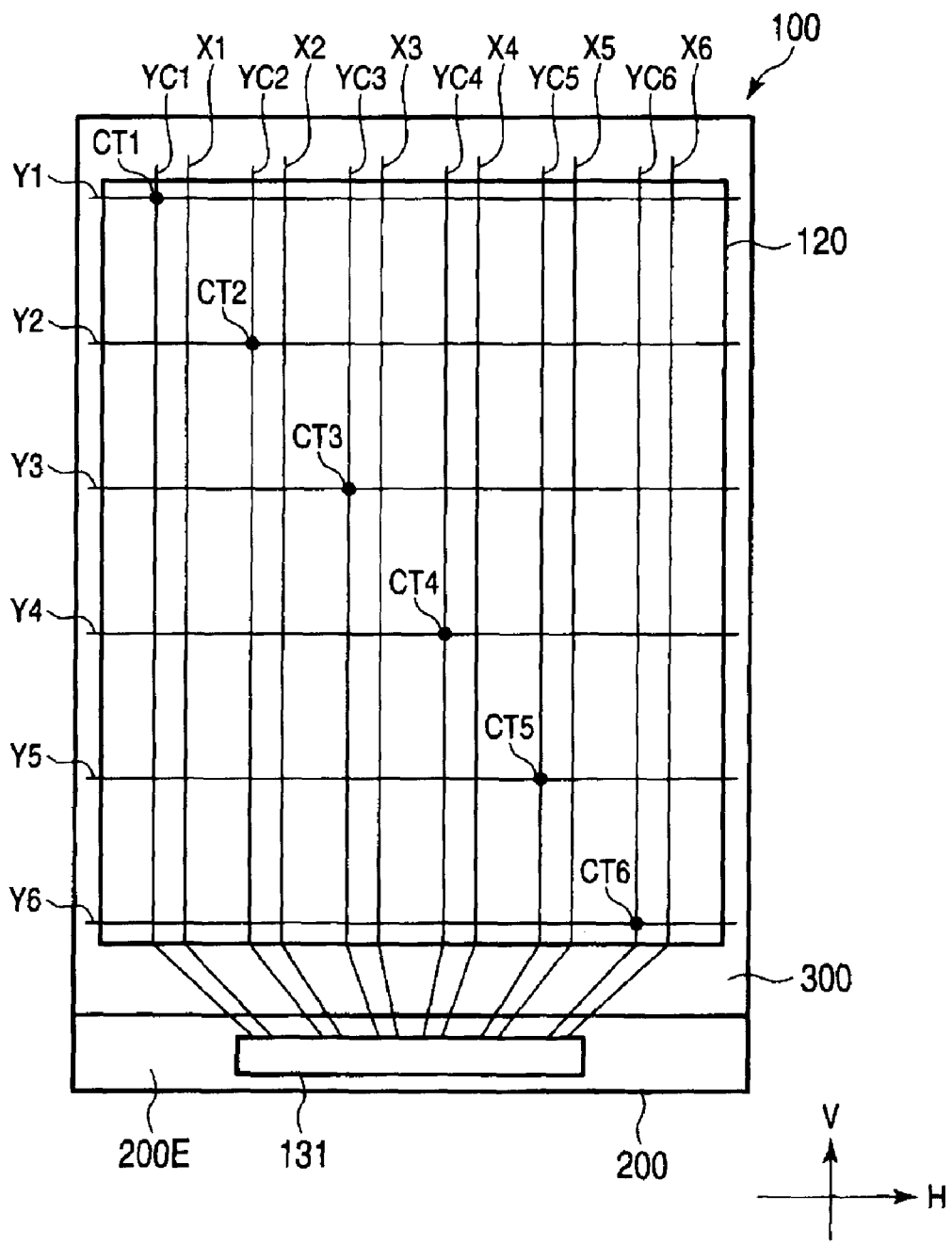
FIG. 5 is a plan view showing an arrangement of contact portions between respective gate lines and gate connecting lines in a case respective numbers of the gate lines and the gate connecting lines are the same.

Next, an example where the number of the gate lines Y and source lines X is the same (i.e. m=n, in FIG. 1) will be explained. FIG. 5 shows an example in which the number of the gate lines Y and source lines X is 6, respectively. Gate lines Y1, Y2, Y3, Y4, Y5 and Y6 are arranged in this order in the row direction H. Source lines X1, X2, X3, X4, X5 and X6 are arranged in this order in the column direction V.

In this case, the gate connecting lines YC and the source lines X are alternately arranged, and the number of the gate connecting lines YC and source lines X is the same. The gate connecting lines YC1, YC2, YC3, YC4, YC5 and YC6 are arranged in this order in the column direction V in parallel with the source lines X. Each of the gate connecting lines YC1~YC6 crosses to all the six gate lines Y1~Y6 and connected to one of the gate lines Y through a contact portion CT. In the example shown in FIG. 5, each gate line Y is sequentially connected to respective gate connecting lines YC in the order of this arrangement. That is, the gate line Y1 is connected to the gate connecting line YC1, through a contact portion CT1.

Similarly, the gate line Y2 to the gate connecting line YC2 through a contact portion CT2, the gate line Y3 to the gate connecting line YC3 through a contact portions CT3, the gate line Y4 to the gate connecting line YC4 through a contact portion CT4, and the gate line Y5 to the gate connecting line YC5 through a contact portion CT5 and the gate line Y6 to the gate connecting line YC6 through a contact portion CT6.

Figure 6:
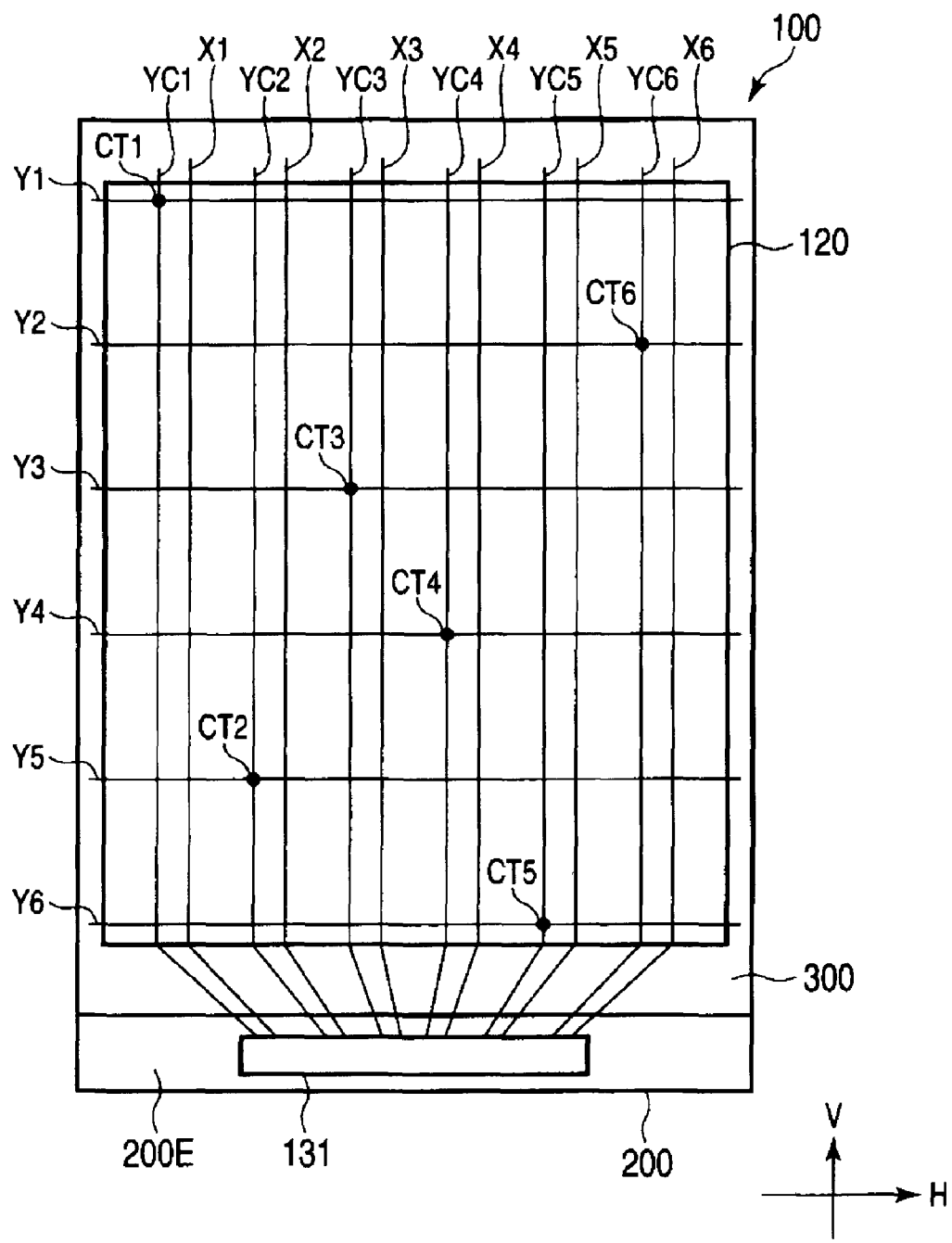
FIG. 6 is a plan view showing other arrangement of contact portions between respective gate lines and gate connecting lines in a case respective numbers of the gate lines and the gate connecting lines are same and the contact portions are arranged in random.

In an example shown in FIG. 6, the contact portions CT are arranged in random, that is, though the gate line Y1 is connected to the gate connecting line YC1 through the contact portion CT1, the gate line Y2 adjacent to the gate line Y1 is connected to the gate connecting line YC6 through the contact portion CT6. The gate line Y3 is connected to the gate connecting line YC3 through the contact portion CT3. Similarly, the gate line Y4 is connected to the gate connecting line YC4 through the contact portion CT4, the gate line Y5 to the gate connecting line YC2 through the contact portion CT2 and the gate line Y6 to the gate connecting line YC5 through the contact portion CT5. In the above-example, it becomes possible to suppress a defective display and obtain an even display.

Figure 7:
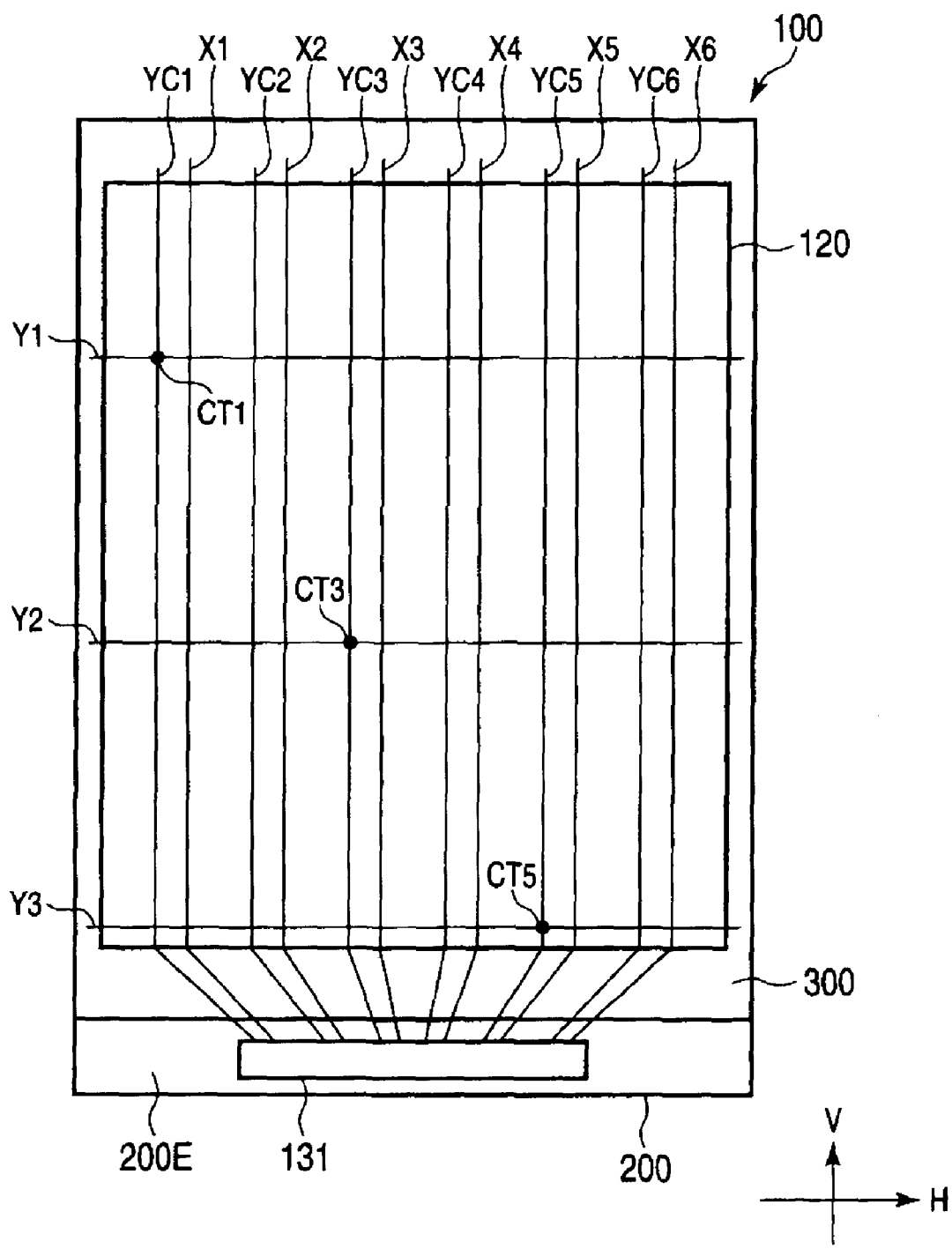
FIG. 7 is a plan view showing other arrangement of contact portions between respective gate lines and gate connecting lines in the case the number of the gate lines is smaller than that of source lines.

Next, other example will be explained, in which the number of the gate lines Y and source lines X is different, particularly, the number of the gate lines Y is smaller than the source lines X, (i.e. m<n, shown in FIG. 1). In the example shown in FIGS. 7 and 8, the number of the gate lines Y is three and the number of source lines X is six, respectively.

The gate lines Y1, Y2 and Y3 are arranged in this order in the row direction H. The source lines X1, X2, X3, X4, X5 and X6 are arranged in this order in the column direction V. In this example, the gate connecting lines YC and source lines X are alternately arranged and the number of the gate connecting lines YC and source lines X are the same. The gate connecting lines YC1~YC6 are arranged in this order in the column direction V. Each of the gate connecting lines YC1~YC6 crosses with all the gate lines Y1~Y3. However, halves of the gate connecting lines YC1~YC6 are not connected to any of the gate lines Y1~Y6.

According to this example, it becomes possible to adjust the number of the gate lines Y by thinning out the contact portions CT. In the example shown in FIG. 7, the gate line Y1 is connected to the gate connecting line YC1 through the contact portion CT1. Similarly, the gate line Y2 is connected to the gate connecting line YC3 through the contact portion CT3, the gate line Y3 to the gate connecting line YC5 through the contact portion CTS. On the other hand, the gate connecting lines YC2, YC4 and YC6 are not connected to any of gate lines Y, that is, the lines are dummy connecting lines.

In the above-described construction, each of the pixel electrodes 230 of the pixels arranged in the column direction V and connected to source line X1 face the gate connecting line YC1. Similarly, each pixel electrode of the pixels PX arranged in the column direction V and connected with the source lines X2~X6 faces the gate connecting lines YC2~YC6, respectively. Accordingly, it becomes possible to make the aperture ratio substantially same for all the pixels of the active area 120.

Figure 8:
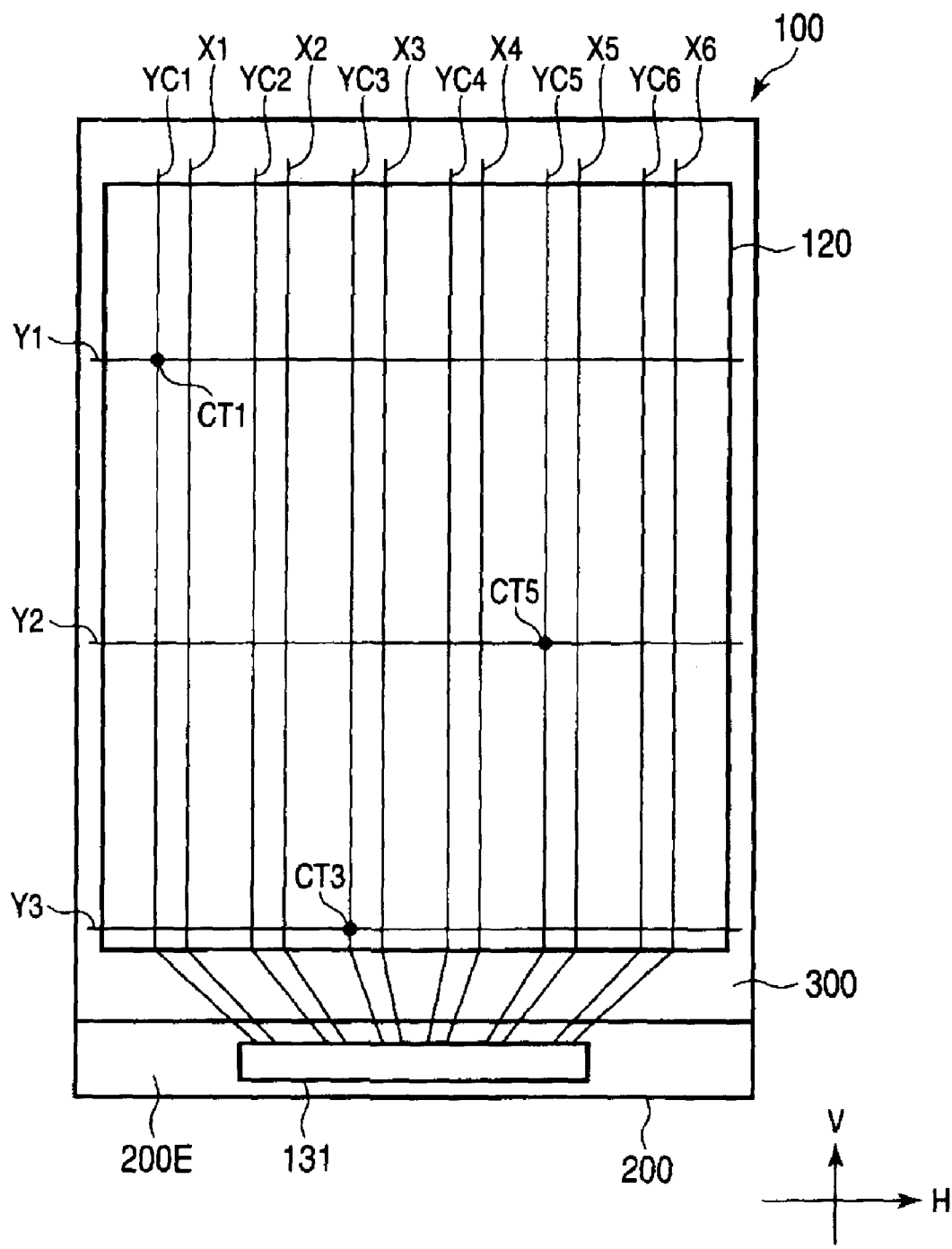
FIG. 8 is a plan view showing other arrangement of contact portions between respective gate lines and gate connecting lines in the case the number of the gate lines is smaller than that of source lines and the contact portions are arranged in random.

In an example shown in FIG. 8, the contact portions CT are arranged in random, that is, though the gate line Y1 is connected to the gate connecting line YC1 through the contact portion CT1, the gate line Y2 adjacent the gate line Y1 is connected to the gate connecting line YC5 through the contact portion CT5. The gate line Y3 is connected to the gate connecting line YC3 through the contact portion CT3. According to this example, the substantially same effect as that shown in FIG. 7 can be achieved.

According to the first embodiment of the present invention, the peripheral areas to pull out the gate lines Y from the active area 120 in the panel to a signal supply source 131 outside the active area 120 are not required, which results in decrease in the frame area and achievement of a narrow frame display. Further, since the gate connecting lines YC are arranged in the active area 120, this invention can be applicable to the case where the number of the pixels PX, that is, the number of gate lines Y, increases without increasing the frame size. Accordingly, a narrow frame display can be achieved regardless of the number of the pixels PX and the gate lines Y.

Figure 9:
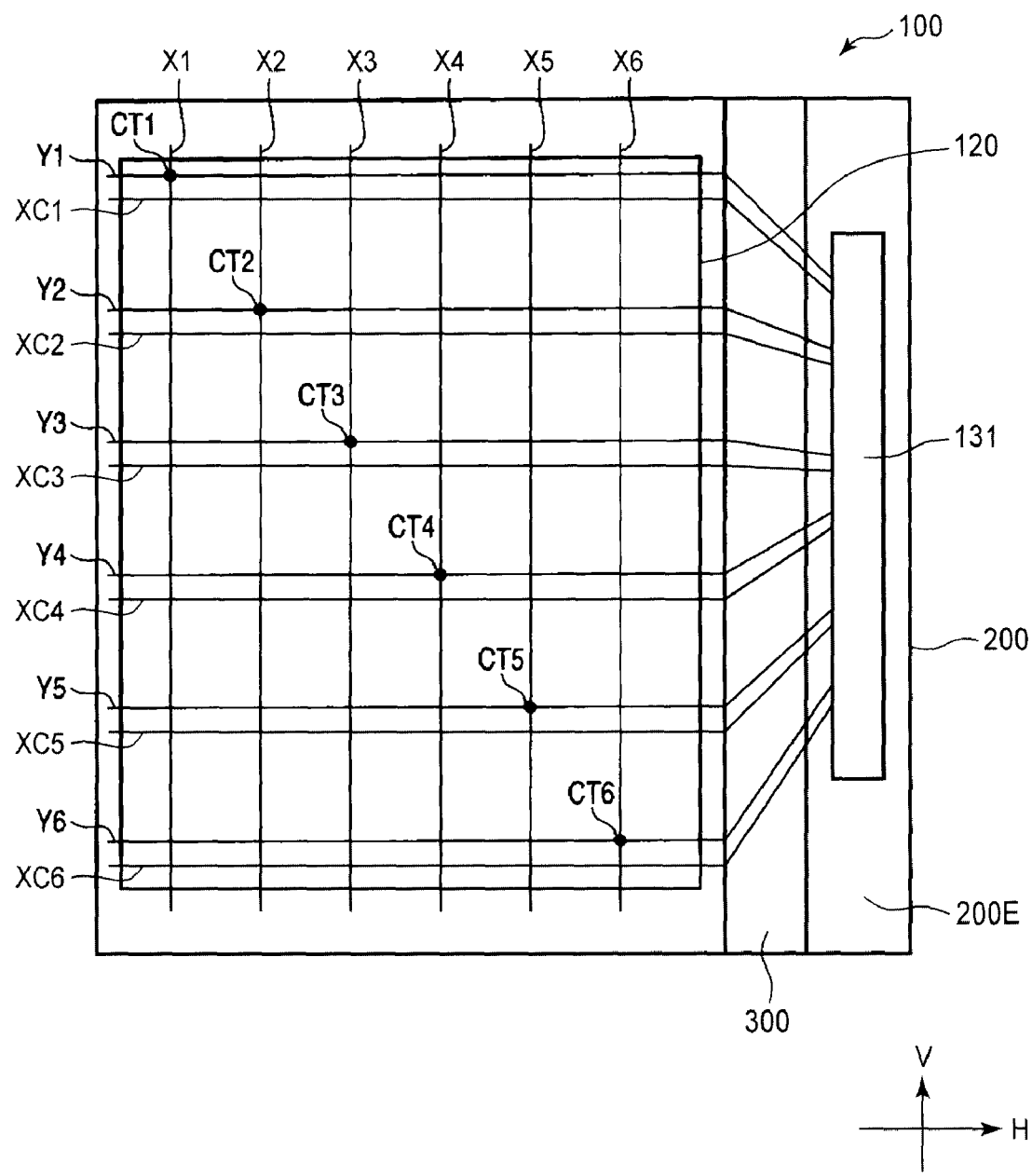
FIG. 9 is a schematic plan view showing a liquid crystal panel of a liquid crystal display device according to a second embodiment of the invention.
Figure 10:
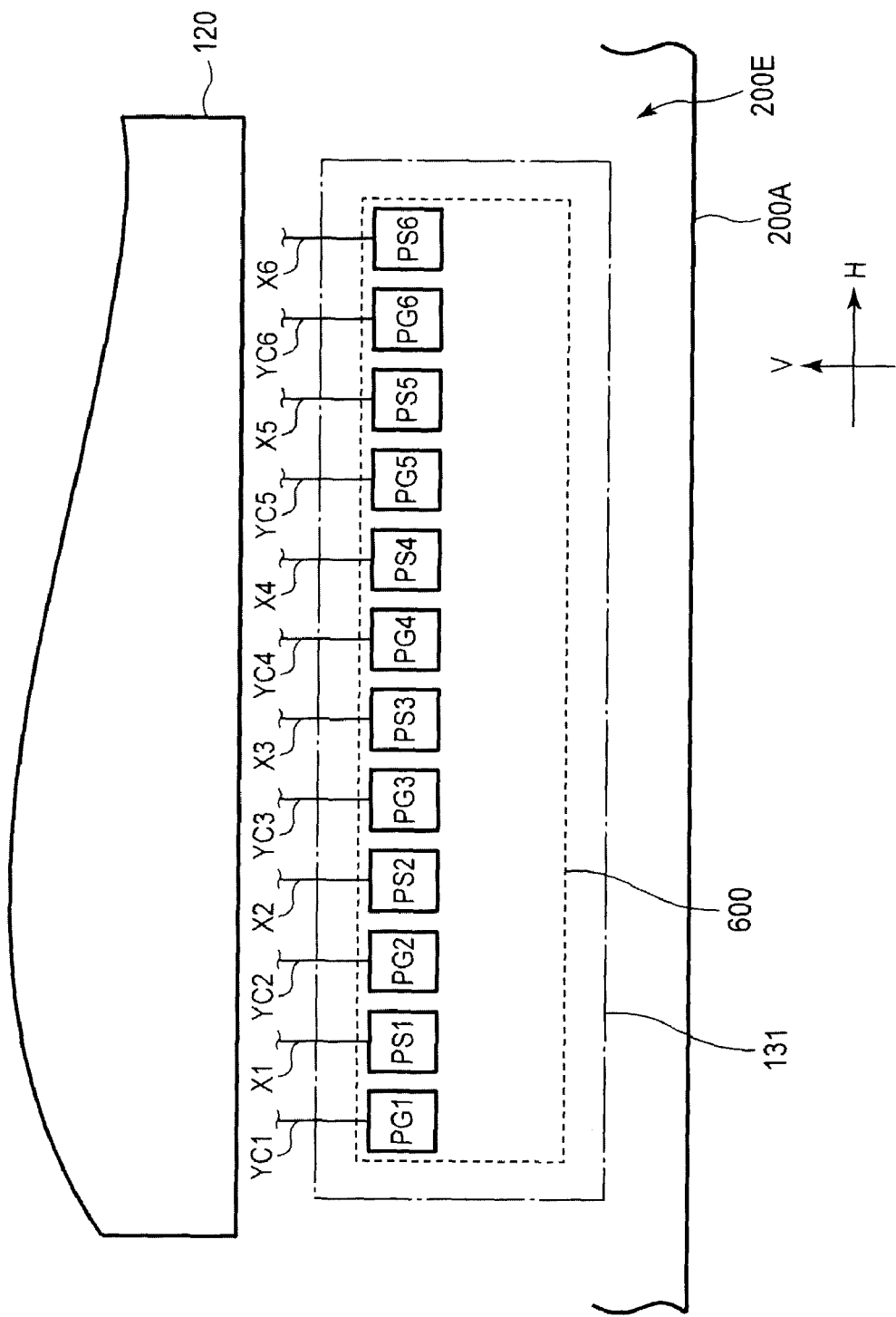
FIG. 10 is a plan view showing a structure of a signal supply source shown in FIG. 1 according to a third embodiment of the invention.

FIG. 9 is a schematic plan view showing a liquid crystal panel of a liquid crystal display device according to a second embodiment of the invention. In the first embodiment shown in FIG. 1, the gate lines Y are connected to the signal supply source 131 through the connecting lines YC arranged in parallel with the source lines X. However, in the second embodiment, the source connecting lines XC arranged in parallel with the gate lines Y are connected to the signal supply source 131. Though the gate lines Y are connected to the signal supply source 131 directly, the source lines X are connected to the signal supply source 131 through source connecting lines XC. In this embodiment, substantially the same effect as the liquid display device shown in FIG. 1, can be achieved. That is, a narrow frame display can be obtained FIG. 10 shows a third embodiment according to the present invention, in which the signal supply source 131 includes first pads PG1~PG6 connected to respective gate connecting lines YC1~YC6 and second pads PS1~PS6 connected to respective source lines X1~X6. The pads PG and PS are alternately arranged. Output pins of the signal supply source 131 correspond to the pad layout. Accordingly, it becomes possible to supply predetermined signals from the signal supply source 131 to respective gate connecting lines YC and source lines X in the narrow frame liquid crystal panel 100 shown in FIGS. 1 to 9.

In this embodiment, the pads PG and pads PS are arranged in a line extending in the row direction H. One driving IC chip 600 which includes a gate driver to supply scan signals to the gate connecting lines YC and a source driver to supply image signals to source lines X. That is, output pins of the driving IC chip 600 are arranged in a line corresponding to the pad layout, and the output pins to supply scan signals to the gate connecting lines YC and the output pins to supply image signals to the source lines X are alternately arranged.

According to the above construction, it becomes possible to make a distance between the active area 120 and the edge 200A of the array substrate 200 small. That is, not only the width between the active area 120 and respective three edges, 100B, 100C and 100D, but the area of the extended area 200E can be made small, which results in achieving further narrow frame of the display.

Figure 11:
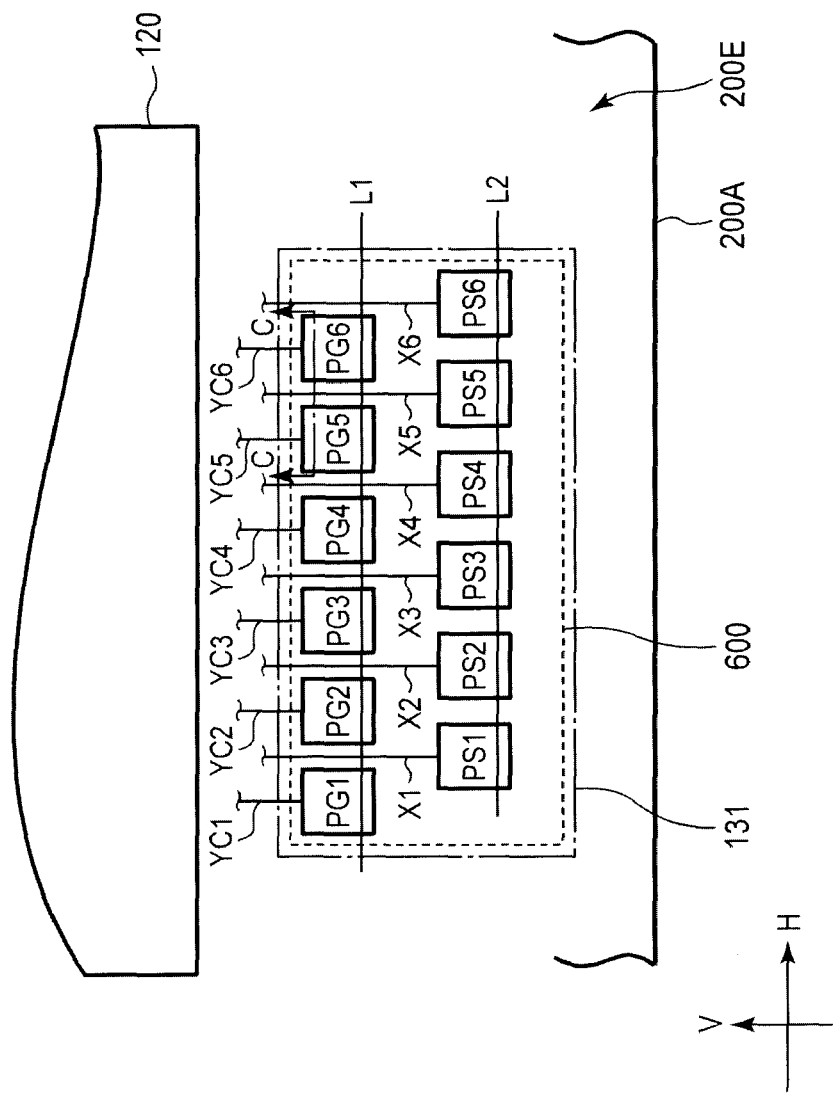
FIGS. 11 and 13 are plan views showing structures of the signal supply source shown in FIG. 1 according to a fourth embodiment of the invention.

FIG. 11 shows a fourth embodiment according to the present invention, in which the pads PG and the pads PS are alternately arranged. Further, the pads PG and the pads PS are arranged in two lines L1 and L2 extending in the row direction H in zigzag. Six pads PG are arranged close to the active area 120 in a line L1 extending in the row direction H.

On the other hand, six pads PS are arranged in a line L2. Each of the source lines X1~X6 is pulled out from the pads PS1~PS6 at the side of the edge 200A extending an area between adjacent pads PG1~PG6 to the active area 120. Respective source lines X cross with the line L1 where the six pads PG are arranged. In the layout of the pads PG and PS shown in FIG. 11, a driving IC chip 600 includes a gate driver to supply scan signals to the gate connecting lines YC (gate lines Y) and a source driver to supply image signals to the source lines X. The output pins of the driving IC chip are arranged in zigzag in accordance with the pad layout shown in FIG. 11. The driving IC chip 600, for example, is provided with bumps BU located in accordance with the output pins, shown in FIG. 12.

Figure 12:
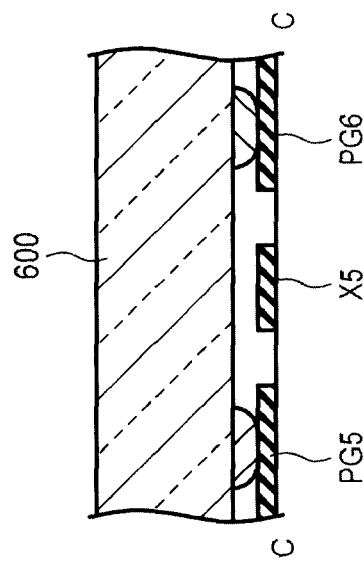
FIG. 12 is a cross-sectional view showing a structure to connect IC chip to pads.

FIG. 12 shows a connecting structure to connect a driving IC chip 600 to the pads PG and PS according to this embodiment. Respective source lines X pass a space between the driving IC chip 600 and the substrate, and an area between the adjacent pads PG. According to this embodiment, it become possible to make length of layouts of the pads PG and PS small, respectively, which is capable of making a size of the driving IC chip 600 small.

Figure 13:
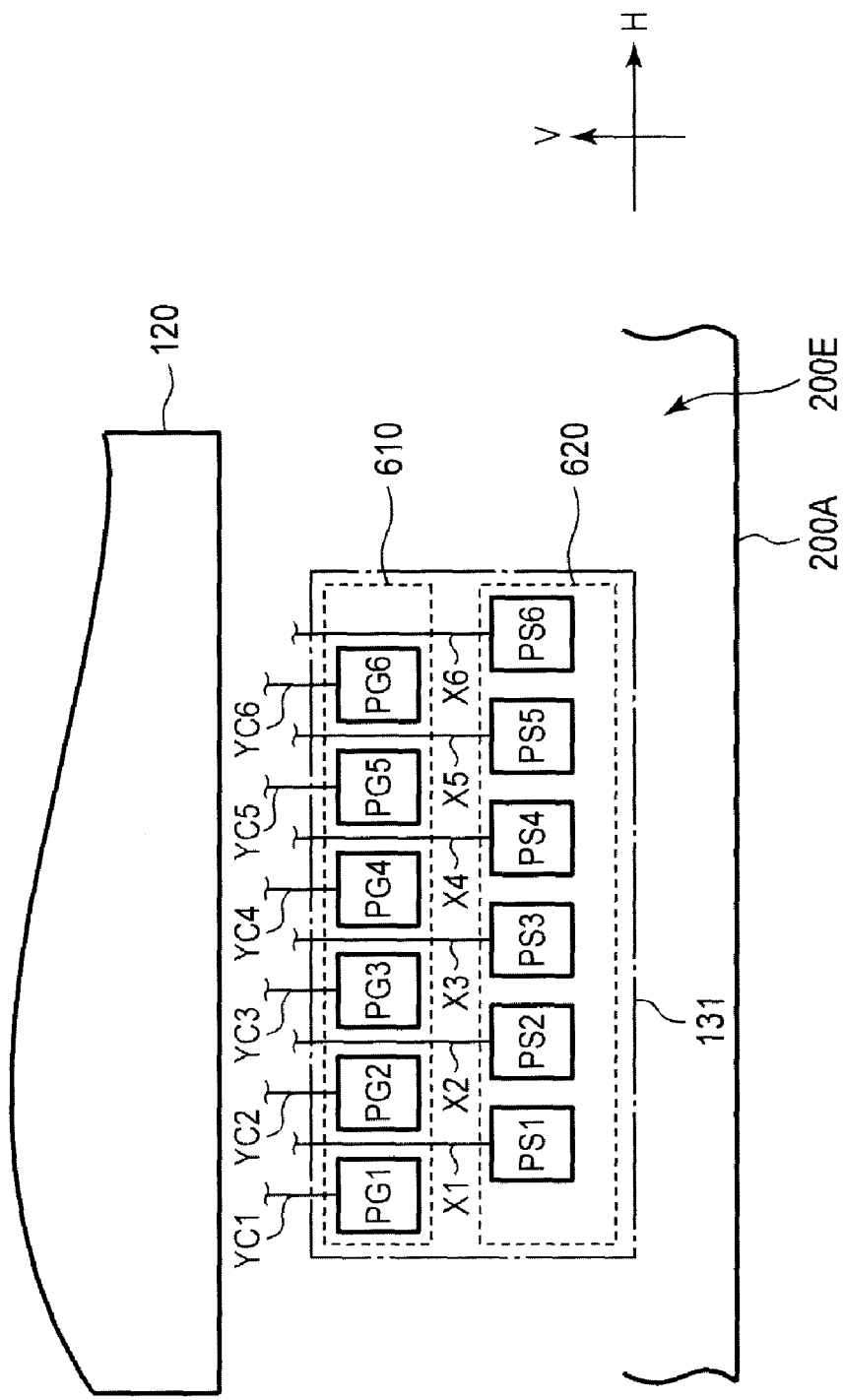

As shown in FIG. 13, the driving IC chip 600 may be constructed of two driving IC chips of a first driving IC chip 610 connected to the pads PG and a second IC chip 620 connected to the pads PS. In this case, the first driving IC chip 610 and second driving IC chip 620 include a gate driver and a source driver, respectively. According to this embodiment, it becomes possible to make the area of the signal supply source 131 small and also to make the size of the first and second driving IC chips make small. Though, an arrangement in which the pads PG are located closer to the side of the active area 120 than the pads PS in FIGS. 11 and 13, same effect can be achieved in the case where the pads PS are located closer to the side of the active area 120.

Next, fifth embodiment of the present invention will be explained referring to FIG. 14. The signal supply source 131 includes first pads PG1~PG6 and second pad PS1~PS6 arranged in a line and extending in the row direction H, respectively. The source lines X1~X6 connected to the pads PS are detoured in the signal supply source 131 without crossing each other and pulled out passing a space between adjacent pads PG to the active area 120, without being pulled out directly. Respective gate connecting lines YC and the source lines X are alternately pulled out from the side of the pads PG.

In the above embodiment, the source lines X1~X6 are detoured and pulled out from the side of the pads PG. However, in an example shown in FIG. 15, the gate connecting lines YC1~YC6 are detoured in the signal supply source 131 and pulled out from the side of pads PS to the active area 120.

Figure 14:
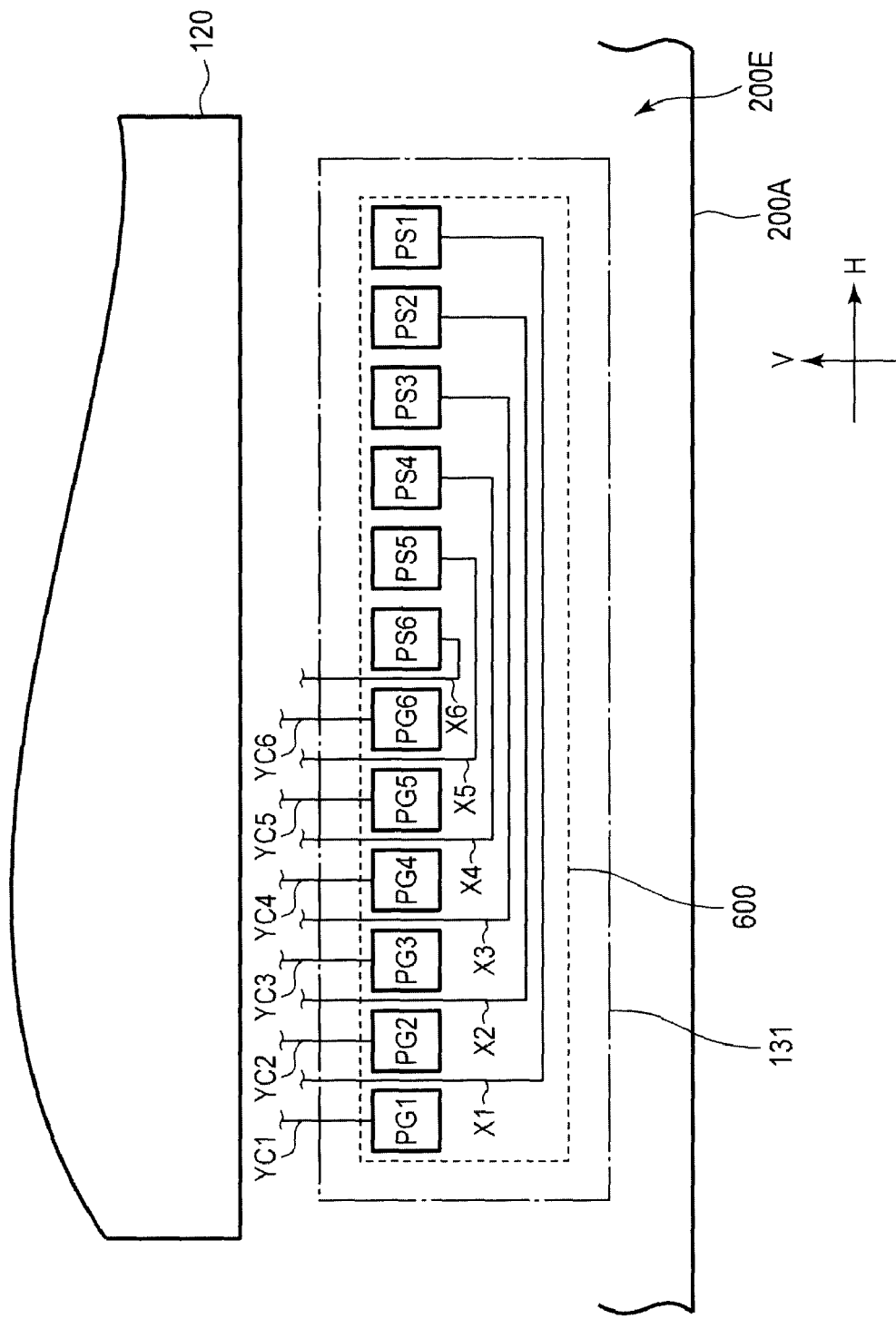
FIGS. 14, 15 and 16 are plan views showing structures of the signal supply source shown in FIG. 1 according to a fifth embodiment of the invention.
Figure 15:
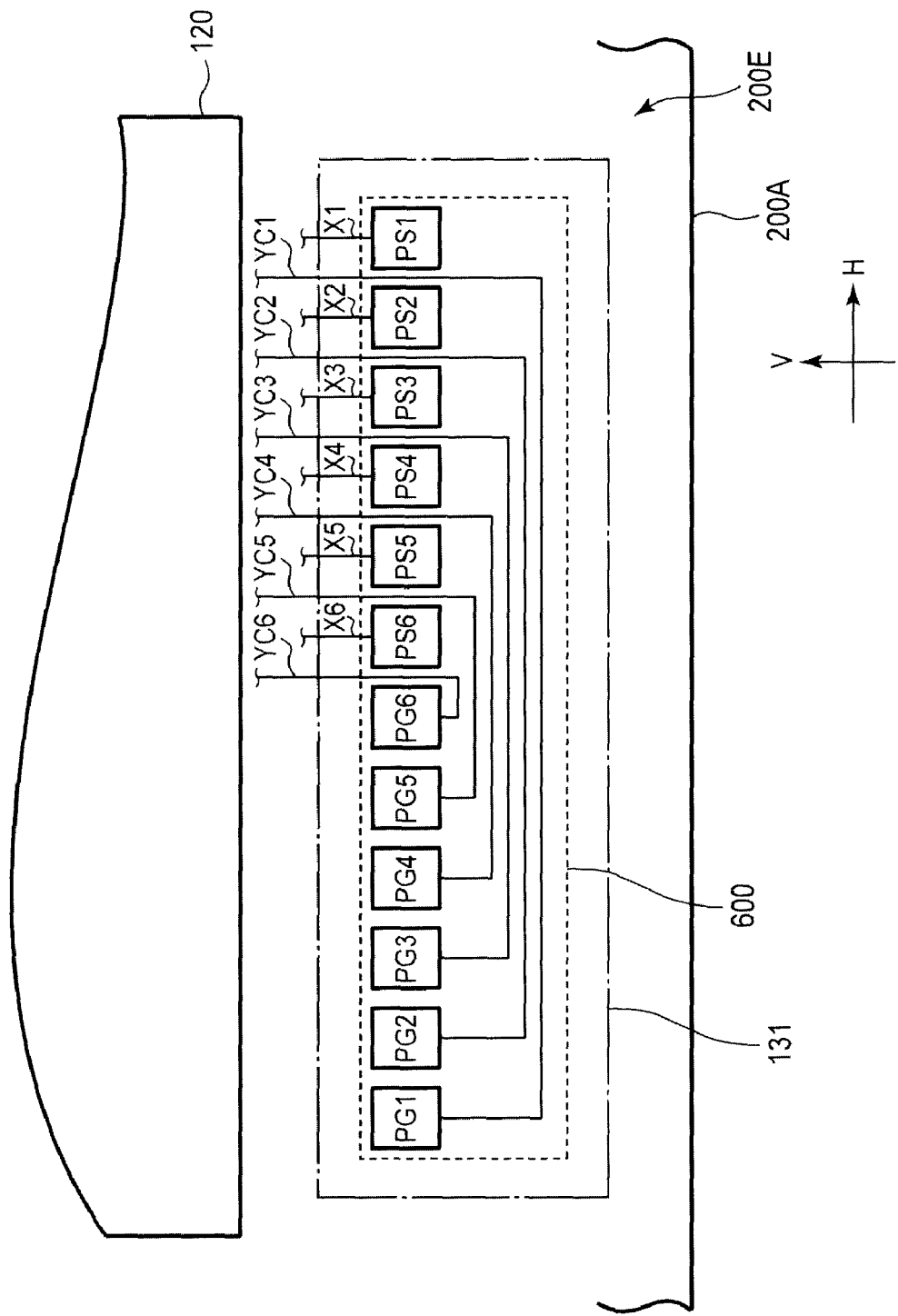

In the embodiments shown in FIGS. 14 and 15, respective pads PG and pads PS are arranged in a line extending in the row direction H. In this case, single driving IC chip 600, in which a gate driver to supply scan signals to the gate connecting lines YC (gate lines Y) and a source driver to supply image signals to the gate lines Y are arranged in the row direction H, can be connected to the pads PG and PS.

Further, when the wiring lines are detoured and pulled out, the wiring lines supplied different signals do not cross each other. Therefore, generations of wiring short or some display defects due to the capacitance between the wirings can be prevented.

Figure 16:
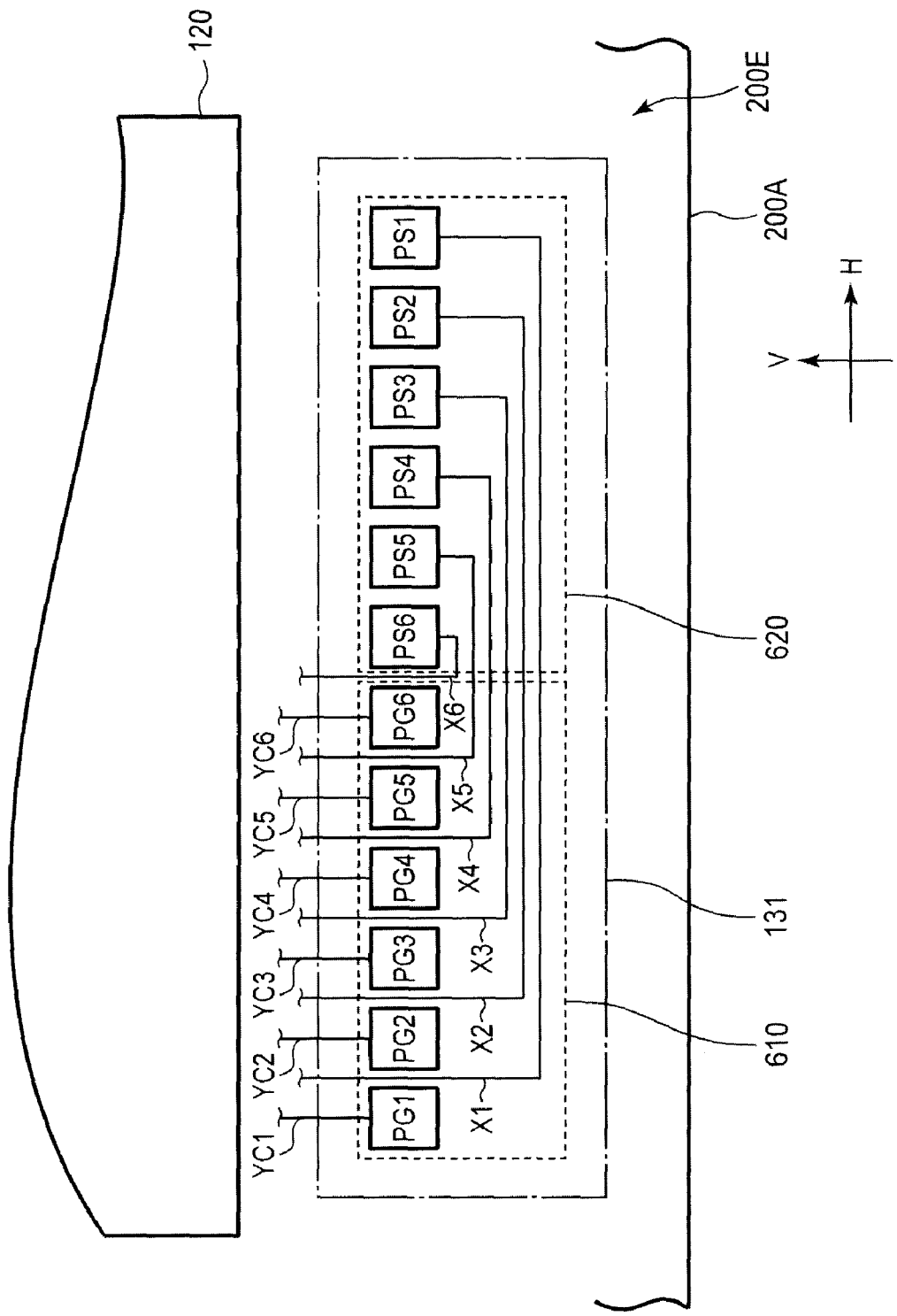

Moreover, a first driving IC chip 610 and a second driving IC chip 620 made independently, may be arranged in the row direction H as shown in FIG. 16. In this case, the first driving IC chip 610 includes a gate driver, and the second driving IC chip 620 includes a source driver. This arrangement can also provide the same effect as that shown in FIG. 14.

According to the embodiments shown in FIGS. 14 to 16, general IC chips can be used for the liquid crystal device shown in the first and second embodiments without redesigning the arrangement of the output pins of the driving IC chips, or by slightly modifying the pin arrangement.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed herein.

What is claimed is:

1. A liquid crystal display device including a liquid crystal display panel, comprising:
    an active area including a plurality of pixels arranged in a matrix;
    first signal lines extending in a row direction in the active area;
    connecting lines formed in a column direction and arranged so as to cross with the first signal lines interposing an insulating layer;
    contact portions to connect the first signal lines with the connecting lines;
    second signal lines arranged in parallel with the connecting lines in the active area; and
    a signal supply source arranged in a peripheral region located along the active area so as to cross with a line extending in the column direction, and,
    wherein the connecting lines and the second signal lines are pulled out from the active area to the signal supply source to receive signals from the signal supply source.

2. The liquid crystal display device according to claim 1, wherein the connecting lines and the second signal lines are formed using the same material on a gate insulating layer that covers the first signal lines.

3. The liquid crystal display device according to claim 1, wherein the connecting lines are formed of a transmissive conductive material.

4. The liquid crystal display device according to claim 1, wherein the first signal lines are gate lines, the second signal lines are source lines and the connecting lines are gate connecting lines, and
    wherein the contact portions are formed on an interlayer insulating film which covers the source lines and the gate connecting lines and contact with the gate lines through first contact hole which penetrates the gate insulating layer and the interlayer insulating film, and also contact with the gate connecting lines through second contact hole which penetrates the interlayer insulating film.

5. The liquid crystal display device according to claim 4, the liquid crystal display device further includes pixel electrodes provided to respective pixels and opposed to the gate connecting lines interposing the interlayer insulating film, and the contact portions are formed of the same conductive material as the pixel electrodes.

6. The liquid crystal display device according to claim 1, the second signal lines and the connecting lines are alternately arranged in the active area.

7. The liquid crystal display device according to claim 6, the number of the second signal lines and the connecting lines is the same.

8. The liquid crystal display device according to claim 7, respective connecting lines extend to whole active area.

9. The liquid crystal display device according to claim 7, respective connecting lines cross with the first signal lines and connected to the first signal lines through the contact portions.

10. The liquid crystal display device according to claim 7, at least one of the connecting lines crosses with the first signal lines, but is not connected to any of the first signal lines.

11. The liquid crystal display device according to claim 6, each of adjacent first signal lines is connected to the respective connecting lines which are not adjacent each other.

12. A liquid crystal display device including a liquid crystal display panel, comprising:
    a first substrate formed in a rectangular shape;
    a second substrate opposite to the first substrate, the first substrate including an extending area in a longitudinal direction of the first substrate beyond an edge of the second substrate;
    an liquid crystal display layer held between the first and second substrates,
    an active area formed of the first and second substrates and liquid crystal display layer and including a plurality of pixels arranged in a matrix;
    first signal lines formed on the first substrate extending in a row direction in the active area;
    connecting lines formed on the first substrate in a column direction and arranged so as to cross with the first signal lines interposing an insulating layer;
    contact portions formed on the first substrate to connect the first signal lines to the connecting lines;
    second signal lines formed on the first substrate and arranged in parallel with the connecting lines in the active area; and
    a signal supply source arranged in the extending area along an edge of the active area so as to cross with a line extending in the column direction, and,
    wherein the connecting lines and the second signal lines are pulled out to the signal supply source in the active area to receive signals from the signal supply source.

13. The liquid crystal display device according to claim 12, wherein the first signal lines are gate lines, the second signal lines are source lines and the connecting lines are gate connecting lines, and
    wherein the contact portions are formed on an interlayer insulating film which covers the source lines and the gate connecting lines and contact with the gate lines through first contact hole which penetrates the insulating layer and the interlayer insulating film, and contact with the gate connecting lines through second contact hole which penetrates the interlayer insulating film.

14. The liquid crystal display device according to claim 13, the liquid crystal display device further includes pixel electrodes provided to respective pixels and opposed to the gate connecting lines interposing the interlayer insulating film, and the contact portions are formed of the same conductive material as the pixel electrodes.

15. The liquid crystal display device according to claim 14, wherein the gate connecting lines extend so as to overlap with respective pixel electrodes at a center region of the pixel electrode.

16. The liquid crystal display device according to claim 15, wherein the contact portions are arranged out of the pixel electrodes.

17. The liquid crystal display device according to claim 12, the number of the second signal lines and the connecting lines is the same, and the second signal lines and the connecting lines are alternately arranged in the active area.

18. A liquid crystal display device including a liquid crystal display panel, comprising:
an active area including a plurality of pixels arranged in a matrix;
first signal lines extending in a row direction in the active area;
connecting lines formed in a column direction and arranged so as to cross with the first signal lines interposing an insulating layer;
contact portions to connect the first signal lines with connecting lines;
second signal lines arranged in parallel with the connecting lines in the active area;
a signal supply source arranged in a peripheral region located along the active area so as to cross with a line extending in the column direction; and,
wherein the connecting lines and the second signal lines are pulled out from the active area to the signal supply source to receive signals from the signal supply source, and
wherein the signal supply source includes a first pad to supply a first signal to the connecting lines and a second pad to supply a second signal to the second signal lines.

19. The liquid crystal display device according to claim 18, wherein the first and second pads are arranged in a line extending in the row direction.

20. The liquid crystal display device according to claim 18, wherein the liquid crystal display device includes a driving IC chip connected to the first and second pads and containing drivers to supply the first and second signals to the connecting lines and second signal lines, respectively.

21. A liquid crystal display device including a liquid crystal display panel, comprising:
first and second substrates interposing a liquid crystal layer therebetween,
an active area including a plurality of pixels arranged in a matrix;
first signal lines formed on the first substrate extending in a row direction in the active area;
connecting lines formed on the first substrate in a column direction arranged so as to cross with the first signal lines interposing an insulating layer;
contact portions formed on the first substrate to connect the first signal lines to the connecting lines;
second signal lines formed on the first substrate and arranged in parallel with the connecting lines in the active area; and
a signal supply source arranged in a peripheral region located along the active area so as to cross with a line extending in the column direction; and,
wherein the connecting lines and the second signal lines are pulled out from the active area to the signal supply source to receive signals from the signal supply source,
wherein the signal supply source includes a first pad to supply a first signal to the connecting lines and a second pad to supply a second signal to the second signal lines, and the first and second pads arranged in two lines extending in the column direction in zigzag, and
wherein the second signal lines and the connecting lines arranged alternately are pulled out from the active array to the signal supply source, and the connecting lines are connected to the first pads, and the respective second signal lines extend in an area between adjacent first pads to the active area without crossing each other.

22. The liquid crystal display device according to claim 21, wherein the liquid crystal display device includes a driving IC chip connected to the first and second pads and containing drivers to supply first and second signals to the connecting lines and the second signal lines, respectively.

23. The liquid crystal display device according to claim 22, wherein the liquid crystal display device further includes first driving IC chip connected to the first pad to supply the first signal to the connecting lines and second driving IC chip connected to the second pad to supply the second signal to the second signal lines.

24. The liquid crystal display device according to claim 22, wherein the driving IC chip includes bumps connected to the first and second pads forming a space between the driving IC chip and the first substrate, and the second signal lines extend between an area adjacent first pads to the active area through the space.

25. A liquid crystal display device including a liquid crystal display panel, comprising:
first and second substrates interposing a liquid crystal layer therebetween,
an active area including a plurality of pixels arranged in a matrix;
first signal lines formed on the first substrate extending in a row direction in the active area;
connecting lines formed on the first substrate in a column direction arranged so as to cross with the first signal lines interposing an insulating layer;
contact portions formed on the first substrate to connect the first signal lines to the connecting lines;
second signal lines formed on the first substrate and arranged in parallel with the connecting lines in the active area; and
a signal supply source arranged in a peripheral region located along the active area so as to cross with a line extending in the column direction; and,
wherein the connecting lines and the second signal lines are pulled out from the active area to the signal supply source to receive signals from the signal supply source,
wherein the signal supply source includes a first pad to supply a first signal to the connecting lines and a second pad to supply a second signal to the second signal lines, and the first and second pads are arranged in a line, and
wherein the connecting lines are connected to the first pad, and the respective second signal lines are detoured along an edge of the first substrate without crossing each other to the first pad side and extend to an area between adjacent first pads to the active area.

26. The liquid crystal display device according to claim 25, wherein the liquid crystal display device includes a driving IC chip connected to the first and second pads and containing drivers to supply the first and second signals to the connecting lines and the second signal lines, respectively.

27. The liquid crystal display device according to claim 26, wherein the driving IC chip includes bumps connected to the first and second pads forming a space between the driving IC chip and the first substrate, and the second signal lines extend between an area adjacent first pads to the active area through the space.

28. The liquid crystal display device according to claim 25, wherein the liquid crystal display device further includes a first driving IC chip connected to the first pad to supply the first signal to the connecting lines and a second driving IC chip connected to the second pad to supply the second signal to the second signal lines.

29. A liquid crystal display device including a liquid crystal display panel, comprising:
   a first substrate formed in a rectangular shape;
   a second substrate opposite to the first substrate, the first substrate including an extending area in a longitudinal direction of the first substrate beyond an edge of the second substrate;
   a liquid crystal display layer held between the first and second substrates,
   an active area formed of the first and second substrates and liquid crystal display layer and including a plurality of pixels arranged in a matrix;
   first signal lines formed on the first substrate extending in a row direction in the active area;
   connecting lines formed on the first substrate in a column direction and arranged so as to cross with the first signal lines interposing an insulating layer;
   contact portions formed on the first substrate to connect the first signal lines to the connecting lines;
   second signal lines formed on the first substrate and arranged in parallel with the connecting lines in the active area;
   a signal supply source arranged in the extending area along an edge of the active area so as to cross with a line extending in the column direction; and,
   wherein the connecting lines and the second signal lines are pulled out to the signal supply source in the active area to receive signals from the signal supply source, and
   wherein the signal supply source includes a first pad to supply a first signal to the connecting lines and a second pad to supply a second signal to the second signal lines, and the first and second pads are alternately arranged.

30. The liquid crystal display device according to claim 29, wherein the first and second pads are arranged in a line extending in the row direction.

31. The liquid crystal display device according to claim 29, wherein the liquid crystal display device includes a driving IC chip connected to the first and second pads and containing drivers to supply the first and second signals to the connecting lines and the second signal lines, respectively.

32. A liquid crystal display device including a liquid crystal display panel, comprising:
   a first substrate formed in a rectangular shape;
   a second substrate opposite to the first substrate, the first substrate including an extending area in a longitudinal direction of the first substrate beyond an edge of the second substrate;
   an liquid crystal display layer held between the first and second substrates,
   an active area formed of the first and second substrates and liquid crystal display layer and including a plurality of pixels arranged in a matrix;
   first signal lines formed on the first substrate extending in a row direction in the active area;
   connecting lines formed on the first substrate in a column direction arranged so as to cross with the first signal lines interposing an insulating layer;
   contact portions formed on the first substrate to connect the first signal lines to the connecting lines;
   second signal lines formed on the first substrate and arranged in parallel with the connecting lines in the active area;
   a signal supply source arranged in the extending area along an edge of the active area so as to cross with a line extending in the column direction; and,
   wherein the connecting lines and the first signal lines are pulled out to the signal supply source in the active area to receive signals from the signal supply source,
   wherein the signal supply source includes a first pad to supply a first signal to the connecting lines and a second pad to supply signals to the second signal lines, and the first and second pads arranged in two lines extending in the column direction in zigzag, and
   wherein the connecting lines are connected to the first pad, and the respective second signal lines extend in an area between adjacent first pads to the active area without crossing each other.

33. A liquid crystal display device including a liquid crystal display panel, comprising:
   a first substrate formed in a rectangular shape;
   a second substrate opposite to the first substrate, the first substrate including an extending area in a longitudinal direction of the first substrate beyond an edge of the second substrate;
   an liquid crystal display layer held between the first and second substrates,
   an active area formed of the first and second substrates and liquid crystal display layer and including a plurality of pixels arranged in a matrix;
   first signal lines formed on the first substrate extending in a row direction in the active area;
   connecting lines formed on the first substrate in a column direction arranged so as to cross with the first signal lines interposing an insulating layer;
   contact portions formed on the first substrate to connect the connecting lines to the first signal line;
   second signal lines formed on the first substrate and arranged in parallel with the connecting lines in the active area, and
   a signal supply source arranged in the extending area along an edge of the active area so as to cross with a line extending in the column direction; and,
   wherein the connecting lines and the first signal lines are pulled out to the signal supply source in the active area to receive signals from the signal supply source,
   wherein the signal supply source includes a first pad to supply a first signal to the connecting lines and a second pad to supply the second signal to the second signal lines, and the first and second pads are arranged in a line, and
   wherein the connecting lines are connected to the first pad, and the respective first signal lines extend in an area between adjacent pads and are detoured along an edge of the first substrate to the first pad side without crossing each other.

* * * * *